United States Patent [19]
Kiiskinen

[11] Patent Number: 5,894,174
[45] Date of Patent: Apr. 13, 1999

[54] PROTECTION CIRCUIT AND METHOD FOR AN ELECTROMAGNETIC INTERFERENCE SUPPRESSION SYSTEM

[75] Inventor: Esko Kiiskinen, Vaasa, Finland

[73] Assignee: ABB Control DY, Vaasa, Finland

[21] Appl. No.: 08/811,724

[22] Filed: Mar. 6, 1997

[30] Foreign Application Priority Data

Mar. 11, 1996 [FI] Finland .................. 961130

[51] Int. Cl.$^6$ .................. H01F 30/12
[52] U.S. Cl. .................. 307/105; 307/17; 361/85; 323/361
[58] Field of Search .................. 307/105, 17; 361/85, 361/93, 113, 421, 45, 87; 324/128, 520; 340/660, 664; 323/356, 361; 363/39, 40, 50

[56] References Cited

U.S. PATENT DOCUMENTS 5,383,084  1/1995  Gershen et al. .................. 361/113

Primary Examiner—Jeffrey Gaffin
Assistant Examiner—Peter Ganjian

[57] ABSTRACT

The present invention relates to protection circuit and method for the EMI/RFI suppression system (2) of such a five-conductor electrical system in which the neutral conductor (N) is provided with a bandstop-type filter circuit (2) for the suppression of a harmonic interference current component. According to the invention, on the neutral conductor (N) is placed a current transformer (CT) having over its secondary a resistive branch ($R_1$), and in parallel therewith, a filter branch (5) comprising a bandpass filter (LC) tuned to the fundamental frequency of said neutral-conductor filter circuit (2) and said filter branch (5) having in series with said bandpass filter branch (LC) a switch element (4) suitable for short-circuiting said neutral-conductor filter circuit (2) when current in said filter branch (5) exceeds a preset upper limit level.

6 Claims, 3 Drawing Sheets

PROTECTION CIRCUIT AND METHOD FOR AN ELECTROMAGNETIC INTERFERENCE SUPPRESSION SYSTEM

BACKGROUND OF THE INVENTION

The present invention relates to a protection circuit for an EMI/RFI suppression system.

The invention also concerns a method for protecting an EMI/RFI suppression system.

Nonlinear electrical loads having a non-sinusoidal input current such as a steep-rising current pulse, generate harmonic distortions of the nominal frequency on the power network. Such load are, e.g., miniature fluorescent lamps equipped with an electronic ballast. These lamps consume a current pulse of only 1.5 ms duration at the peak of the 50 Hz sinusoidal mains voltage waveform. In a modern office environment, the entire environment may consist of similar low-quality loads such as computers, copiers, printers and air-conditioning systems equipped with electronic fan speed controllers. The dominant harmonic current component caused by such loads, specifically the third harmonic, is summed almost arithmetically on the neutral conductor of the power network. In practice, current peaks which nearly double the phase leg current have been measured on the neutral conductor. Since the conventional neutral conductor has no overload protection, a potential hazard is created under high-load conditions. Moreover, the third harmonic has been found to cause disturbances in data-processing equipment and communications facilities.

Conventionally, such disturbances have been overcome by connecting a bandstop filter, tuned to the third harmonic of the mains frequency, between the load grounding point and the star point of the main transformer.

This arrangement, however, creates a problem if, e.g., in a five-conductor system the protective-earth-grounded equipment housing is incorrectly connected to the neutral conductor, that is, if an improper grounding connection is made. In such a situation, since the neutral connector is essentially isolated from ground for the third harmonic due to the tuned nonstop filter, the distortion current component at this harmonic is reflected back to the point of the incorrect connection, thereby creating a hazardous situation.

Networks may be provided with earth-fault detection systems which are mandatory, e.g., in medical installations and explosion-hazardous environments. Such systems are conventionally based on either a sum current transformer or a current transformer placed on the protective earth (PE) conductor. The low-resistance circuit (water piping, conductive building structures) connected in parallel with the PE conductor make it very difficult to detect fault situation. Therefore, conventional earth-fault detection systems are frequently hampered by false fault alarms.

SUMMARY OF THE INVENTION

It is an object of the present invention to overcome the drawbacks of the above-described techniques and to provide a novel type of protection circuit and method for an EMI/RFI suppression system.

The goal of the invention is achieved by connecting on the neutral conductor a current transformer having over its secondary connected a bandpass filter circuit complemented with a series-connected relay, which is adapted to short-circuit the filter circuit in a fault condition. Furthermore, the present method uses the electrical energy of the fault current for short-circuiting the bandstop filter of the neutral conductor.

More specifically, the protection circuit according to the invention includes a current transformer coupled to the neutral conductor of the electrical system to generate a current in the protection circuit; a bandpass filter, tuned to the frequency of the bandstop filter of the electrical system, for bandpass filtering the current generated by the current transformer; and a switch element connected in series with the bandpass filter, the switch element short circuiting the bandstop filter of the electrical system when a current passing through the bandpass filter exceeds a preset upper limit.

Furthermore, the method according to the invention includes the steps of receiving a current flowing through the neutral conductor of the electrical system; bandpass filtering the received current with a bandpass filter, the bandpass frequency of the bandpass filter being set to the frequency of the bandstop filter of the electrical system; and short circuiting the bandstop filter of the electrical system when a current flowing through the bandpass filter exceeds a preset upper limit.

The invention offers significant benefits over the conventional art.

Specifically, the protection circuit according to the present invention makes it possible to avoid a hazardous situation when an incorrect earthing connection has been made, while eliminating false alarms. By directly using the electrical energy provided by the earth fault current to short-circuit the neutral-conductor bandstop filter, a very simple concept compared to alternative protection embodiments based on analog and/or digital techniques.

BRIEF DESCRIPTION OF THE DRAWING

In the following the invention is described in greater detail with the help of exemplifying embodiments by making reference to the appended drawings, which are given by way of illustration only and thus are not limitative of the present invention, and in which.

DETAILED DESCRIPTION OF THE PREFERRED EMBODIMENTS

Figure 1:
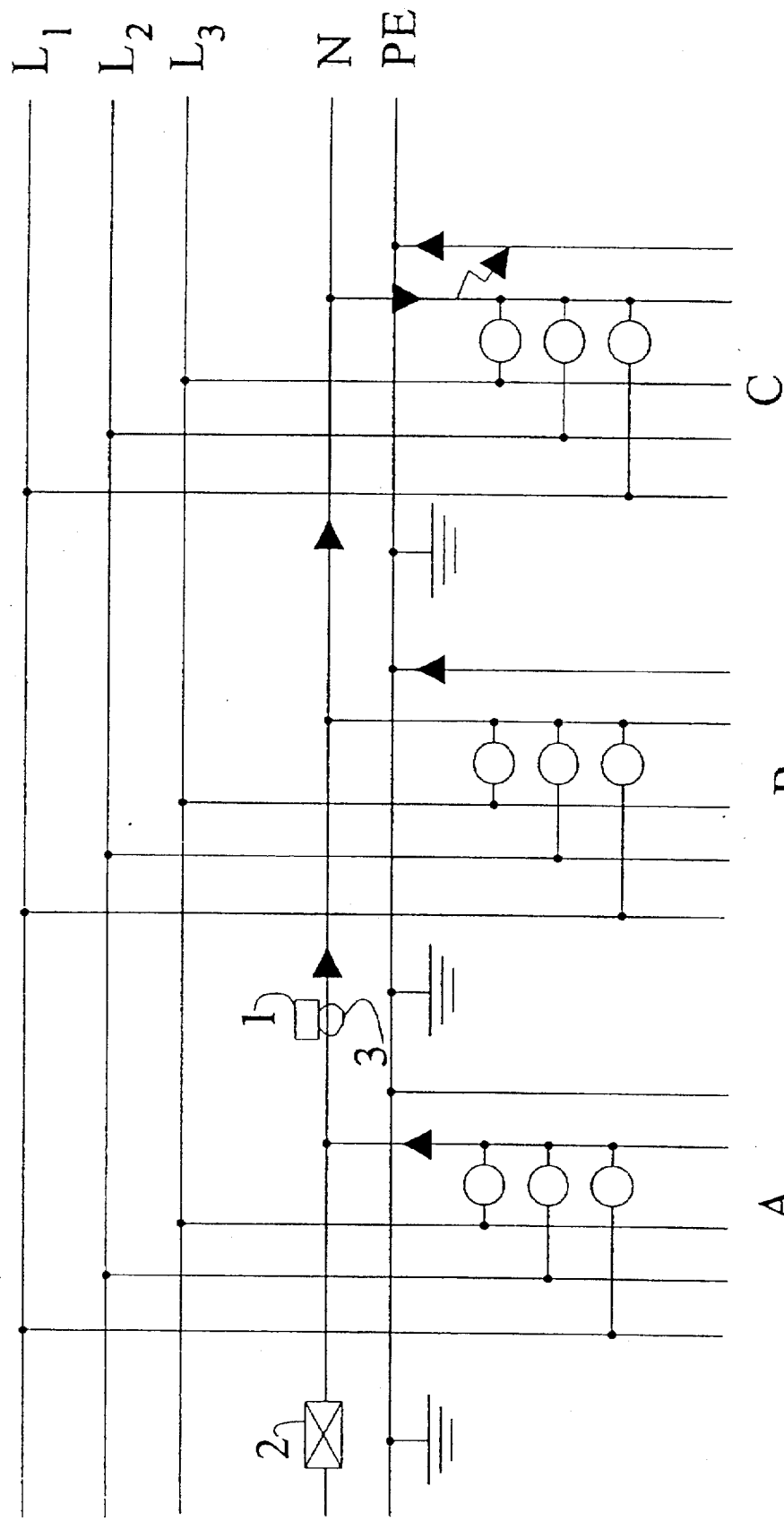
FIG. 1 is a general schematic of an electrical protection circuit according to the present invention.

Referring to FIG. 1, the five-conductor system shown therein includes phase leg conductors $L_1$, $L_2$ and $L_3$, with a neutral conductor N, and a protective earth conductor PE. The PE and N conductors may be connected to each other at a single point only, e.g., at the main power distribution center. The neutral conductor N is provided with a bandstop filter 2 which is tuned to the third harmonic of the mains frequency. In FIG. 1, a fault connection is shown as being made close to the distribution center C, between the PE and N conductors. The bandstop filter 2 of the neutral conductor will cause the fault current from the other distribution centers A and B to also be directed to this point of ground fault. The reason for this ground fault can be for example, an erroneous connection of the protective-earth grounded equipment housing to the neutral conductor N.

Figure 2:
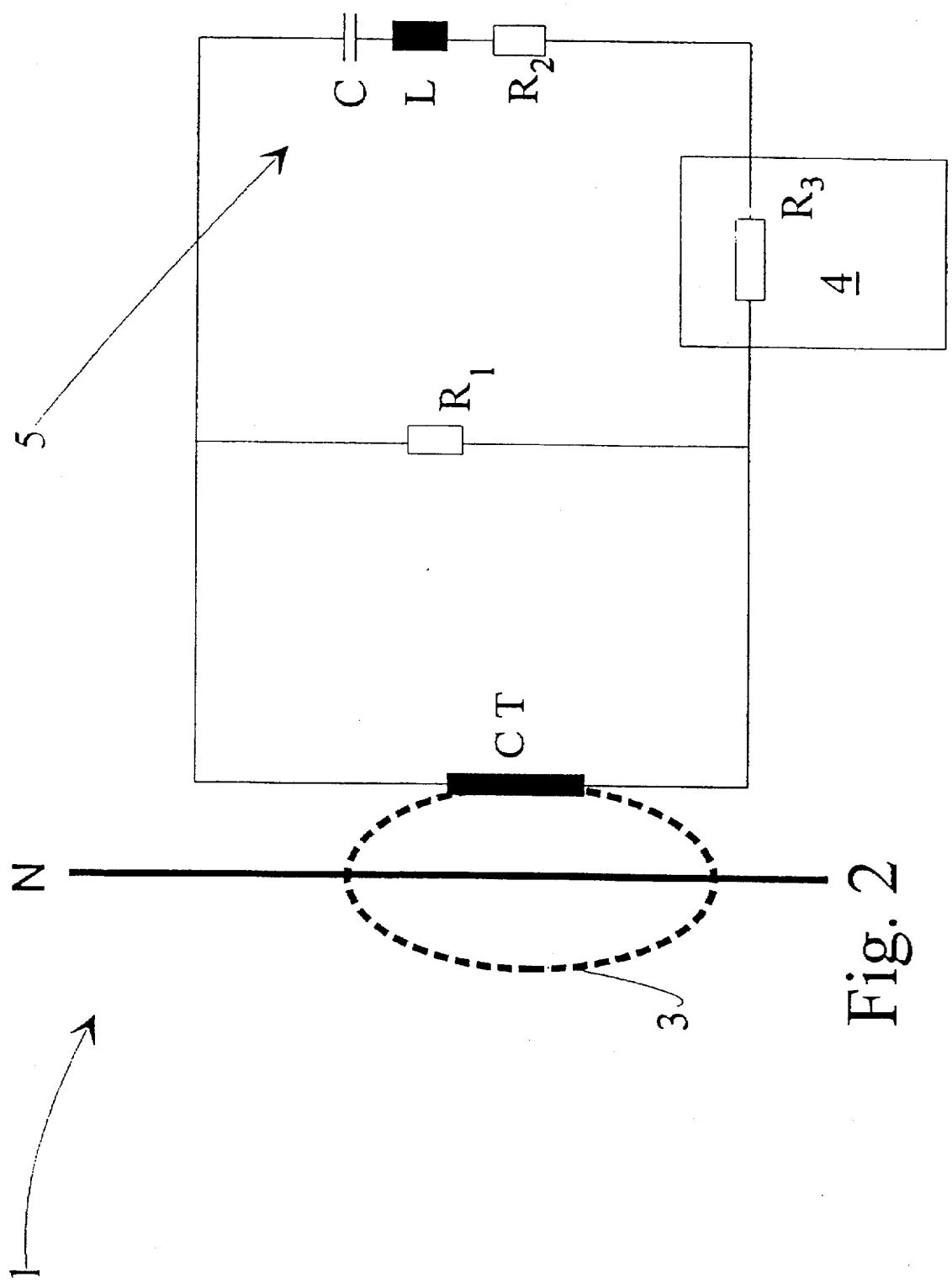
FIG. 2 illustrates in detail the electrical protection circuit of FIG. 1 according to the present invention.
Figure 3:
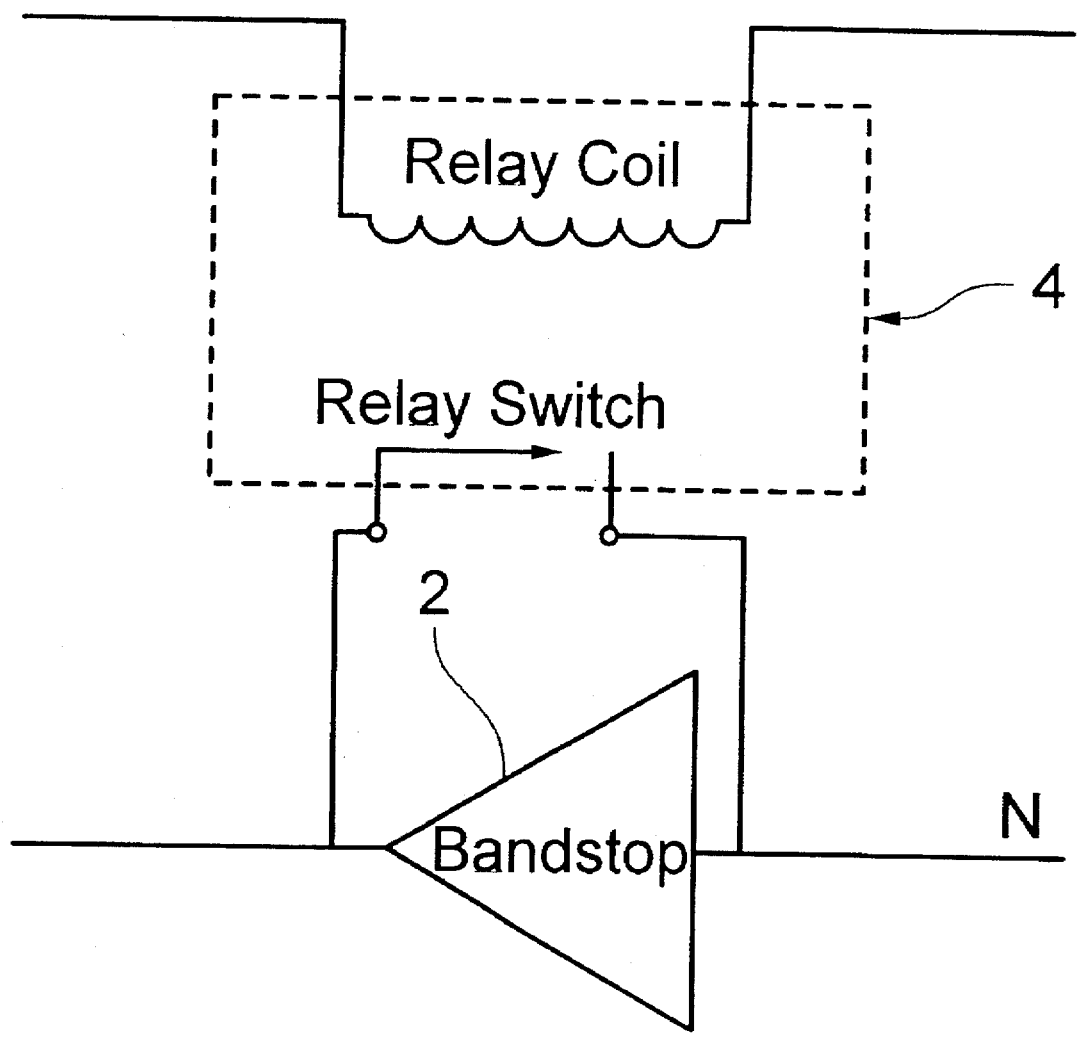
FIG. 3 illustrates an example of the switching element for short-circuiting the bandstop filter of the electrical system according to the present invention.

Now referring to FIG. 2, the neutral conductor N is herein shown to form the primary winding by being threaded through the core opening of the magnetic circuit 3 of a current transformer CT. Two branches are connected in parallel with the secondary of the current transformer CT. One such branch is a purely resistive branch $R_1$ and the other branch, specifically, the filter branch 5 includes a bandpass filter which is tuned to the third harmonic of the mains frequency and a relay 4 which is connected in series with the bandpass filter. The bandpass filter is realized as a series-connected LC circuit, and due to nonideal components, this branch further has a resistance $R_2$. The resistance of the relay 4 is shown as a resistance $R_3$. FIG. 3 illustrates an example of how a relay could be used to short-circuit the filter 2. When the current in the filter branch 5 reaches a preset upper limit value, the relay 4 short-circuits the EMI/RFI suppression filter 2 and additionally can issue an alarm by means of an auxiliary contact of the relay 4.

Practical design values for the circuit 1 is as follows:
$R_1$ 0.5 ohm
$R_2$ 60 milliohm
$R_3$ 20 milliohm
C 265 μF
L 4.25 mH
Turns ratio of transformer CT is 50/5.

A circuit having the above-given parameters directs the fundamental 50 Hz current component to pass mainly (by 78%) through the resistor $R_1$, while the 150 Hz third harmonic current component is mainly (by 86%) passed by the filter branchs. The relay 4 may be, e.g., a dual contact relay type SJ 155 230 5A by Electromatic Oy. The current adjustment range of this relay is from 1 to 5 A AC and it is operated by a 230 V AC coil voltage. This type of relay 4 has one normally open contact (used for short-circuiting the filter) while the other, normally-closed contact can be used for signalling an alarm circuit. In the illustrated circuit, a 20 A current at the 150 Hz third harmonic in the neutral conductor N can be detected by setting the relay for a 1.7 A upper limit current, which may not yet trip the relay. At the fundamental frequency of 50 Hz, a neutral line current of 50 A causes a 1.1 A current to pass through the relay, which that is insufficient to trip the relay. Thus, the fault current (third harmonic) passing along the neutral conductor N can be directly used to short-circuit the filter 2.

Obviously, the invention is suited for filtering out any harmonic overtone of the mains frequency provided that the filter 2 and the filter branch 5 are tuned at the same frequency.

I claim:

1. A protection circuit for an electrical system which includes a neutral conductor and a bandstop filter, the bandstop filter suppressing an interference current on the neutral conductor, said protection circuit comprising:

a current transformer coupled to the neutral conductor of the electrical system to generate a current in said protection circuit;

a bandpass filter, tuned to the frequency of the bandstop filter of the electrical system, for bandpass filtering the current generated by said current transformer; and a switch element connected in series with said bandpass filter, said switch element short circuiting the bandstop filter of the electrical system when a current passing through said bandpass filter exceeds a preset upper limit.

2. The circuit according to claim 1, wherein the bandstop frequency of the bandstop filter of the electrical system is set to the third harmonic of a mains frequency.

3. The circuit according to claim 1, wherein said switch element is a relay.

4. A method for protecting an electrical system which includes a neutral conductor and a bandstop filter, the bandstop filter suppressing an interference component on the neutral conductor, said method comprising:

receiving a current flowing through the neutral conductor of the electrical system;

bandpass filtering said received current with a bandpass filter, the bandpass filter being tuned to the frequency of the bandstop filter of the electrical system; and short circuiting the bandstop filter of the electrical system when a current flowing through the bandpass filter exceeds a preset upper limit.

5. A method as defined in claim 4 wherein said current flowing through the neutral conductor is received by a current transformer.

6. The method according to claim 4, wherein the bandstop frequency of said bandstop filter is set to the third harmonic of a mains frequency.

* * * * *